United States Patent
Ogata

(10) Patent No.: US 11,841,504 B2
(45) Date of Patent: Dec. 12, 2023

(54) IMAGE DISPLAY DEVICE WITH ROTATABLY HELD IMAGE FORMING OPTICAL UNIT

(71) Applicant: KOITO MANUFACTURING CO., LTD., Tokyo (JP)

(72) Inventor: Yoichi Ogata, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 17/795,841

(22) PCT Filed: Jan. 22, 2021

(86) PCT No.: PCT/JP2021/002342
§ 371 (c)(1),
(2) Date: Jul. 27, 2022

(87) PCT Pub. No.: WO2021/153468
PCT Pub. Date: Aug. 5, 2021

(65) Prior Publication Data
US 2023/0069453 A1 Mar. 2, 2023

(30) Foreign Application Priority Data
Jan. 27, 2020 (JP) .................. 2020-011275

(51) Int. Cl.
*G02B 27/01* (2006.01)
*G09G 3/00* (2006.01)
*G02B 5/20* (2006.01)

(52) U.S. Cl.
CPC ......... *G02B 27/0149* (2013.01); *G09G 3/002* (2013.01); *B60K 2370/1529* (2019.05); *G02B 5/208* (2013.01); *G02B 27/01* (2013.01)

(58) Field of Classification Search
CPC ..... G02B 27/0149; G02B 5/208; G09G 3/002
See application file for complete search history.

(56) References Cited

U.S. PATENT DOCUMENTS

2014/0368922 A1   12/2014  Tohda et al.
2015/0103408 A1*   4/2015  Nishima ............ G02B 27/0101
                                                                 359/618

(Continued)

FOREIGN PATENT DOCUMENTS

DE   102004012032 A1   9/2005
JP   2010-197493 A     9/2010

(Continued)

OTHER PUBLICATIONS

International Search Report issued in International Application No. PCT/JP2021/002342, dated Apr. 6, 2021 (5 pages).

(Continued)

*Primary Examiner* — Roy P Rabindranath
(74) *Attorney, Agent, or Firm* — Osha Bergman Watanabe & Burton LLP

(57) ABSTRACT

An image display device has a first image projection unit configured to emit light for forming a first image, an image forming optical unit configured to form the first image at a first distance and cause the first image to be incident on a viewpoint of a user, and a rotation support unit configured to rotatably hold the image forming optical unit with a fulcrum point as a rotation center.

6 Claims, 4 Drawing Sheets

(56) References Cited

U.S. PATENT DOCUMENTS

| | | |
|---|---|---|
| 2017/0010465 A1 | 1/2017 | Martinez et al. |
| 2017/0090202 A1 | 3/2017 | Tatsuta |
| 2018/0024373 A1 | 1/2018 | Joseph et al. |
| 2019/0164463 A1 | 5/2019 | Shim et al. |

FOREIGN PATENT DOCUMENTS

| | | |
|---|---|---|
| JP | 2012-071825 A | 4/2012 |
| JP | 2014-010361 A | 1/2014 |
| JP | 2017-068045 A | 4/2017 |
| JP | 2018-118669 A | 8/2018 |
| JP | 2018-528446 A | 9/2018 |

OTHER PUBLICATIONS

Written Opinion issued in International Application No. PCT/JP2021/002342, dated Apr. 6, 2021 (5 pages).
Extended European Search Report in corresponding European Application No. 21747530.0, dated Jun. 20, 2023 (8 pages).

* cited by examiner

IMAGE DISPLAY DEVICE WITH ROTATABLY HELD IMAGE FORMING OPTICAL UNIT

TECHNICAL FIELD

The present disclosure relates to an image display device.

BACKGROUND ART

In the related art, as a device for displaying various kinds of information in a vehicle, an instrument panel for lighting and displaying an icon has been used. In addition, as an amount of information to be displayed increases, it has been proposed that an image display device is embedded in the instrument panel or the entire instrument panel is configured by the image display device.

Since the instrument panel is located below a windshield of the vehicle, it is not preferable for a driver to visually recognize information displayed on the instrument panel because it is necessary for the driver to move a line of sight downward during driving. Therefore, there has been proposed a head up display (hereinafter, referred to as HUD) that projects an image onto a windshield so that information can be read when a driver visually recognizes the front of a vehicle (see, for example, Patent Literature 1). In such an HUD, an optical device for projecting an image over a wide range of a windshield is required, and reduction in size and weight of the optical device is desired.

As an image display device that projects light using a small optical device, a head mounted HUD having an eyeglass shape is known (see, for example, Patent Literature 2). The head mounted HUD directly irradiates eyes of the user with light emitted from a light source to project an image on the retina of the user.

CITATION LIST

Patent Literature

Patent Literature 1: JP-A-2018-118669
Patent Literature 2: JP-T-2018-528446

SUMMARY OF INVENTION

Technical Problem

However, in the head mounted HUD of the related art, a background and the image can be displayed in a superimposed manner, but an image forming position of the image formed in the air (aerial image) is fixed within the field of view of a viewer, and a degree of freedom of a display position is low. As a result, the aerial image may be displayed at an inappropriate position depending on the use of the user or the preference of each individual, and it is difficult to provide an appropriate image viewing experience.

An object of the present disclosure is to provide an image display device capable of changing a position of an image to be formed in a space and improving a degree of freedom of a display position.

Solution to Problem

An image display device according to the present disclosure includes a first image projection unit configured to emit light for forming a first image, an image forming optical unit configured to form the first image at a first distance and cause the first image to be incident on a viewpoint of a user, and a rotation support unit configured to rotatably hold the image forming optical unit with a fulcrum point as a rotation center.

In such an image display device according to the present disclosure, a position of the first image to be formed in the space can be changed by rotating the image forming optical unit held by the rotation support unit around the fulcrum point as a center, and a degree of freedom of a display position can be improved.

Advantageous Effects of Invention

According to the present disclosure, it is possible to provide the image display device capable of changing the position of an image to be formed in a space and improving the degree of freedom of the display position.

DESCRIPTION OF EMBODIMENTS

First Embodiment

Figure 1:
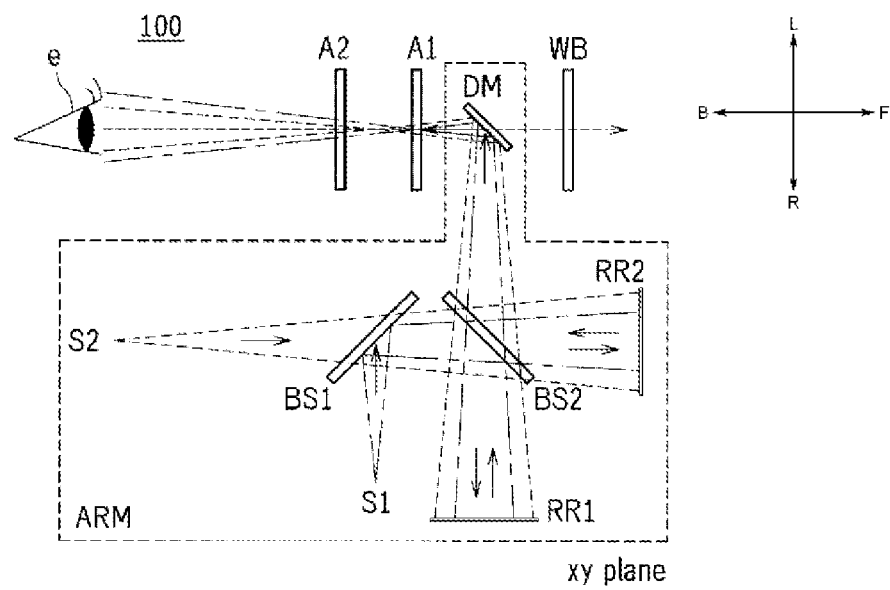
FIG. 1 is a plan view showing an image display device according to a first embodiment.

Hereinafter, embodiments of the present disclosure will be described in detail with reference to the drawings. The same or equivalent components, members, and processes shown in the drawings are denoted by the same reference numerals, and a repeated description thereof will be omitted as appropriate. In addition, for convenience of description, dimensions of the respective members shown in the drawings may be different from actual dimensions of the respective members. FIG. 1 is a schematic plan view showing a configuration of an image display device 100 according to a first embodiment. As shown in FIG. 1, the image display device 100 includes beam splitters BS1, BS2, retroreflection units RR1, RR2, a dichroic mirror DM, a first image projection unit S1, a second image projection unit S2, and a rotation support unit ARM.

In the image display device 100 shown in FIG. 1, the user visually recognizes a first image A1 and a second image A2 projected from the first image projection unit S1 and the second image projection unit S2 at different distances in a depth direction from a viewpoint e. Here, the user includes a viewer.

In FIG. 1, a left-right direction of a paper surface is referred to as a depth direction. In addition, in FIG. 1, an up-down direction of the paper surface orthogonal to the depth direction is referred to as a lateral direction. Further, a direction orthogonal to the depth direction and the lateral direction is defined as a vertical direction. The "depth direction" is a direction including a "front direction" and a "rear direction". The "lateral direction" is a direction including a "left direction" and a "right direction". The "vertical direction" is a direction including an "up direction" and a "down direction". In the drawings to be described below, a reference numeral U denotes the up direction. A reference numeral D denotes the down direction. A reference numeral F denotes the front direction. A reference numeral B denotes the rear direction. A reference numeral L denotes the left direction. A reference numeral R denotes the right direction. Here, in FIG. 1, the left-right direction is expressed in the depth direction which is a line-of-sight direction from the viewpoint e, but the horizontal direction and the vertical direction are for expressing the positional relationship in FIG. 1, and the up, down, left and right may be changed.

The beam splitter BS1 is a member that transmits a part of incident light and reflects a part of the incident light. A partial reflection plate on which a film for adjusting a reflectance is formed may be used on a surface of the beam splitter BS1. The beam splitter BS1 is arranged at an angle of 45 degrees with respect to the lateral direction and the depth direction. In addition, the beam splitter BS1 is also arranged so as to be inclined at 45 degrees with respect to optical axes of light emitted from the first image projection unit S1 and light emitted from the second image projection unit S2.

The beam splitter BS2 is a member that transmits a part of incident light and reflects a part of the incident light. A partial reflection plate on which a film for adjusting the reflectance is formed may be used on a surface of the beam splitter BS2. The beam splitter BS2 is arranged so as to be inclined at an angle of 45 degrees with respect to the lateral direction and the depth direction. The beam splitter BS2 is also arranged so as to be inclined at 45 degrees with respect to optical axes of the light emitted from the first image projection unit S1 and the light emitted from the second image projection unit S2. At this time, the beam splitter BS1 and the beam splitter BS2 are arranged to face each other so as to intersect each other at an angle of 90 degrees.

Here, the light transmittance and reflectance of the beam splitters BS1, BS2 can be selected in any balance. For example, both the beam splitters BS1, BS2 have a transmittance of 50% and a reflectance of 50%. In the present embodiment, the beam splitters BS1, BS2 are arranged so as to be inclined at 45 degrees with respect to the optical axes of the light emitted from the first image projection unit S1 and the light emitted from the second image projection unit S2, and the beam splitters BS1, BS2 are arranged to be orthogonal to each other. However, the arrangement of the beam splitters BS1, BS2 is not limited to the present embodiment, and the beam splitters BS1, BS2 can be arranged at an appropriate angle based on a relationship between light irradiation directions from the first image projection unit S1 and the second image projection unit S2 and the image forming position of the image.

The beam splitters BS1, BS2 of the present embodiment are plate-shaped beam splitters, but may be cube-shaped beam splitters configured by joining inclined surfaces of two right angle prisms so as to sandwich a film for adjusting a reflectance.

The retroreflection units RR1, RR2 are optical members that reflect incident light in an incident direction. For the retroreflection units RR1, RR2, a structure in which fine glass beads are spread on a surface side of the reflective film or a structure using a prism may be used. The retroreflection unit RR1 is arranged on a right side of the beam splitter BS2. A retroreflective surface of the retroreflection unit RR1 is perpendicular to the lateral direction. The retroreflection unit RR2 is arranged in the depth direction side by side with the beam splitters BS1, BS2. A retroreflective surface of the retroreflection unit RR2 is perpendicular to the depth direction.

The dichroic mirror DM is an optical member that reflects light of a specific wavelength and transmits light of other wavelengths. The dichroic mirror DM is arranged on a left side of the retroreflection unit RR1 and the beam splitter BS2, and is arranged so as to be inclined at an angle of 45 degrees in the depth direction. In the example shown in FIG. 1, the dichroic mirror DM reflects the light emitted from the first image projection unit S1 and the second image projection unit S2, and transmits other visible light. As will be described later, since the first image A1 and the second image A2 are formed in a space by the light reflected by the dichroic mirror DM, the dichroic mirror DM constitutes an image forming optical unit in the present disclosure.

Although omitted in FIG. 1, an image forming lens may be arranged as a part of an image forming optical system between the beam splitter BS2 and the dichroic mirror DM. The image forming lens is an optical member for forming an image of light transmitted through the beam splitter BS2 at a predetermined position in the space. A plurality of lens groups may be used as the image forming lens.

Each of the first image projection unit S1 and the second image projection unit S2 is a device that emits light for forming an image, and projects an image at a predetermined distance from the eyes (viewpoint e) of the user via the image forming optical unit. The first image projection unit S1 is arranged on the right side of the beam splitter BS1, and irradiates one surface (a surface facing the beam splitter BS2) of the beam splitter BS1 with light in the lateral direction. The second image projection unit S2 is arranged in a rear direction with respect to the beam splitters BS1, BS2 and the retroreflection unit RR2, and irradiates the other surface (a surface opposite to the beam splitter BS2) of the beam splitter BS1 with light in the depth direction.

The configurations of the first image projection unit S1 and the second image projection unit S2 are not limited, and for example, the first image projection unit S1 and the second image projection unit S2 may be a liquid crystal display device including a backlight, a self-luminous organic EL display device, a projector device using a light source and a modulation element, or the like. The images projected by the first image projection unit S1 and the second image projection unit S2 may be a still image or a moving image, and the images projected by the first image projection unit S1 and the second image projection unit S2 may be the same as or different from each other. In addition, each of the first image projection unit S1 and the second image projection unit S2 may include an optical member such as a lens.

The rotation support unit ARM is a member that supports the beam splitters BS1, BS2, the retroreflection units RR1, RR2, and the dichroic mirror DM included in the image forming optical unit while maintaining a relative positional relationship therebetween, and is a member provided so as to be rotatable around a fulcrum point as a rotation center. In the present embodiment, an example in which the first image projection unit S1 and the second image projection unit S2 are also held by the rotation support unit ARM is shown.

The rotation support unit ARM is configured to be rotatable while maintaining a relative positional relationship between the beam splitters BS1, BS2, the retroreflection units RR1, RR2, the dichroic mirror DM, and the first image projection unit S1 and the second image projection unit S2. Therefore, the rotation support unit ARM needs to be made of a material having a certain degree of rigidity. A specific material or shape of the rotation support unit ARM is not limited, and for example, metal, resin, paper, or the like may be used.

As shown in FIG. 1, the light emitted from the first image projection unit S1 is reflected by the beam splitter BS1 and then reaches the beam splitter BS2. The light emitted from the second image projection unit S2 passes through the beam splitter BS1 and then reaches the beam splitter BS2. By passing through the beam splitter BS1, the light emitted from the first image projection unit S1 and the light emitted from the second image projection unit S2 are incident on the beam splitter BS2 at the same incident angle. That is, after passing through the beam splitter BS1, the optical axis of the remaining light emitted from the first image projection unit S1 and the optical axis of the light emitted from the second image projection unit S2 are aligned in parallel. That is, the beam splitter BS1 functions as an optical axis aligning unit.

A part of the light that has reached the beam splitter BS2 is reflected, travels to the retroreflection unit RR1, is re-reflected by the retroreflection unit RR1, and is re-incident on the beam splitter BS2. The light re-incident on the beam splitter BS2 passes through the beam splitter BS2, is reflected by the dichroic mirror DM, and forms images as the first image A1 and the second image A2. The light formed as the first image A1 and the second image A2 reaches the eyes of the user.

The remaining part of the light that has reached the beam splitter BS2 passes through the retroreflection unit RR2, is re-reflected by the retroreflection unit RR2, and is re-incident on the beam splitter BS2. The light re-incident on the beam splitter BS2 is reflected by the beam splitter BS2, is reflected by the dichroic mirror DM, and forms images as the first image A1 and the second image A2.

As shown in FIG. 1, by using the retroreflection unit RR1 and the retroreflection unit RR2, the light retroreflected by the retroreflection unit RR2 is also reflected by the beam splitter BS2, reaches the dichroic mirror DM, and forms the images as the first image A1 and the second image A2. Therefore, since the light transmitted through the beam splitter BS2 and the light reflected by the beam splitter BS2 are used to form the first image A1 and the second image A2, a decrease in the amount of light is suppressed.

At this time, the light retroreflected by the retroreflection unit RR1 and the light retroreflected by the retroreflection unit RR2 form images of the same content branched by the beam splitter BS2, and need to be superimposed on each other to reach the dichroic mirror DM. Therefore, when optical characteristics of the retroreflection unit RR1 and the retroreflection unit RR2 are the same, it is preferable that a distance from the retroreflection unit RR1 to the beam splitter BS2 is equal to a distance from the retroreflection unit RR2 to the beam splitter BS2.

As described above, the user can visually recognize the first image A1 and the second image A2 at a first distance and a second distance which are different positions in the depth direction when the light for forming the first image A1 and the second image A2 is incident within the field of view of the same user. In addition, in a case where a transmission plate WB that transmits the light from the background is arranged in the line-of-sight direction from the viewpoint e of the user, the first image A1 and the second image A2 formed in the air can be visually recognized while the background is visually recognized through the transmission plate WB and the dichroic mirror DM.

Specific examples of the transmission plate WB include a display surface of a head-up display, a windshield of a vehicle, a shield of a helmet, and the like. In addition, an image may be displayed on these transmission plates WB by using another display device.

Figure 2:
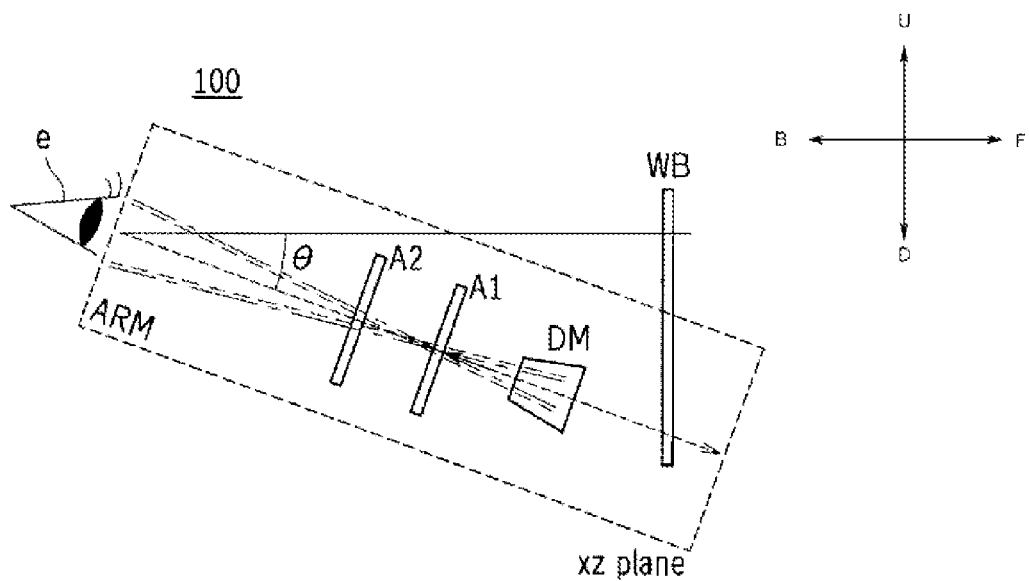
FIG. 2 is a side view showing the image display device according to the first embodiment.
Figure 3:
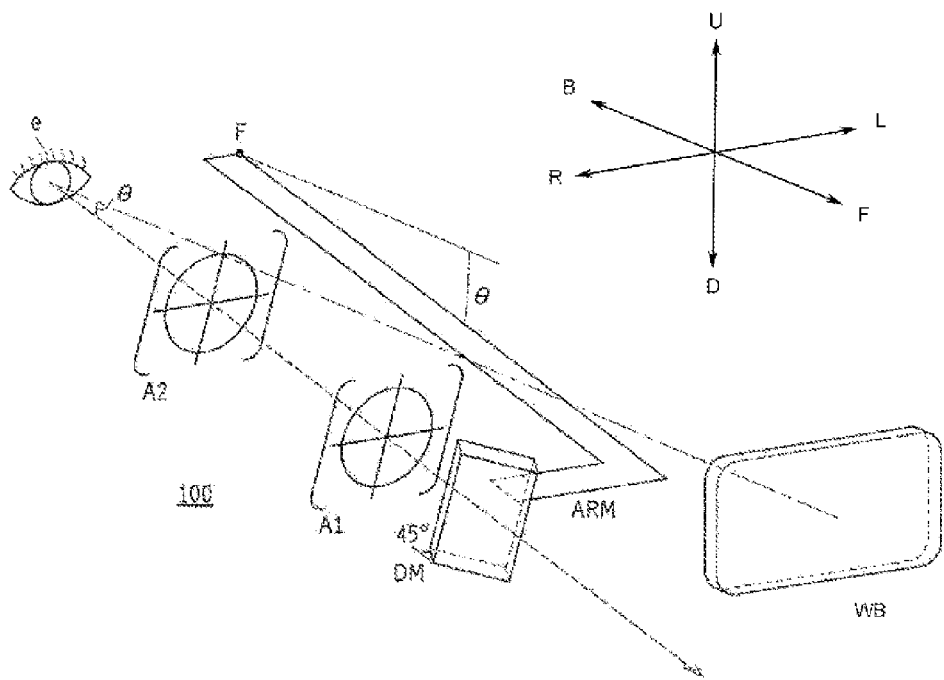
FIG. 3 is a perspective view showing the image display device according to the first embodiment.

FIG. 2 is a schematic side view showing the configuration of the image display device 100 according to the present embodiment. FIG. 3 is a schematic perspective view showing the configuration of the image display device 100 according to the present embodiment. As shown in FIGS. 2 and 3, the rotation support unit ARM holds at least the dichroic mirror DM included in the image forming optical unit, and is rotatable in the up-down direction within an angle range of θ around the fulcrum point F as a rotation center. Here, θ is an angle at which the dichroic mirror DM is rotated up and down by rotating the rotation support unit ARM up and down with the dichroic mirror DM being horizontal as 0 degrees. The direction when θ is 0 degrees (that is, when it is horizontal) is hereinafter referred to as a front center direction. Although FIGS. 2 and 3 show an example in which the rotation support unit ARM is rotated downward from the front center direction as the angle θ, the rotation support unit ARM may be rotated upward.

When the rotation support unit ARM rotates around the fulcrum point F, the beam splitters BS1, BS2, the retroreflection units RR1, RR2, and the dichroic mirror DM shown in FIG. 1 rotate by an angle θ while maintaining a relative positional relationship therebetween. Therefore, the image forming positions in the air of the first image A1 and the second image A2 formed by the light emitted from the first image projection unit S1 and the second image projection unit S2 are also changed by the angle θ similarly to the rotation of the rotation support unit ARM. Accordingly, the user visually recognizes the aerial images of the first image A1 and the second image A2 in the direction displaced by the angle θ from the front center direction.

Here, the range of the angle θ is preferably a range of 25 degrees (−25°<θ<25°) in the up-down direction with respect to the front center direction from the viewpoint e of the viewer. When the angle θ is larger than 25 degrees or less than −25 degrees, an amount of movement of the line of sight for visually recognizing the aerial images of the first image A1 and the second image A2 becomes large, and it becomes difficult to maintain the comfort in the superimposed display with the background.

It is preferable that a distance from the fulcrum point F of the rotation support unit ARM to the dichroic mirror DM which is the image forming optical unit and a distance from the viewpoint e to the dichroic mirror DM are approximately the same. The fulcrum point F and the viewpoint e are preferably at the same position in the depth direction. As a result, a path of the light reflected by the dichroic mirror DM and traveling in a direction of the viewpoint e is displaced at the same angle as the rotation angle θ of the rotation support unit ARM. Therefore, the rotation of the rotation support unit ARM and the displacement of the image forming positions of the first image A1 and the second image A2 are interlocked with each other, and the image forming positions of the first image A1 and the second image A2 can be changed by an intuitive operation.

If the dichroic mirror DM is translated in the vertical direction or the lateral direction, the distance or the relative angle of the dichroic mirror DM as viewed from the viewpoint e changes. In this case, the path of the light reflected by the dichroic mirror DM is different from that shown in FIG. 1, and display contents of the first image A1 and the second image A2 are changed from those before the position change.

In contrast, in the image display device 100 of the present application, the movement of the dichroic mirror DM is not parallel movement in the vertical direction, but rotational movement around the fulcrum point F. As a result, the relative positional relationship and an angle relationship of the image forming optical unit for forming the first image A1 and the second image A2 can be maintained as shown in FIG. 1, and the image forming positions of the first image A1 and the second image A2 can be maintained at the distances from the viewpoint e, and the display content of the aerial image can be maintained regardless of the rotation of the rotation support unit ARM.

As described above, in the image display device 100 of the present embodiment, the dichroic mirror DM held by the rotation support unit ARM rotates around the fulcrum point F. Accordingly, the positions of the first image A1 and the second image A2 to be formed in the space can be changed, and a degree of freedom of a display position can be improved.

According to the above configuration, the rotation support unit ARM of the image display device 100 holds to support not only the image forming optical unit but also the image projection units S1, S2. When the rotation support unit ARM rotates around the fulcrum point F, the image forming optical unit and the image projection units S1, S2 rotates by the same angle as the rotation support unit ARM while maintaining the relative positional relationship between the image forming optical unit and the image projection units S1, S2. Therefore, even when the rotation support unit ARM rotates, the distances from the viewpoint e of the user to the first image A1 and the second image A2 are maintained. Therefore, it is possible to change the display position by the rotation of the rotation support unit ARM while maintaining the display content of the aerial image.

(Modification)

Figure 4A:
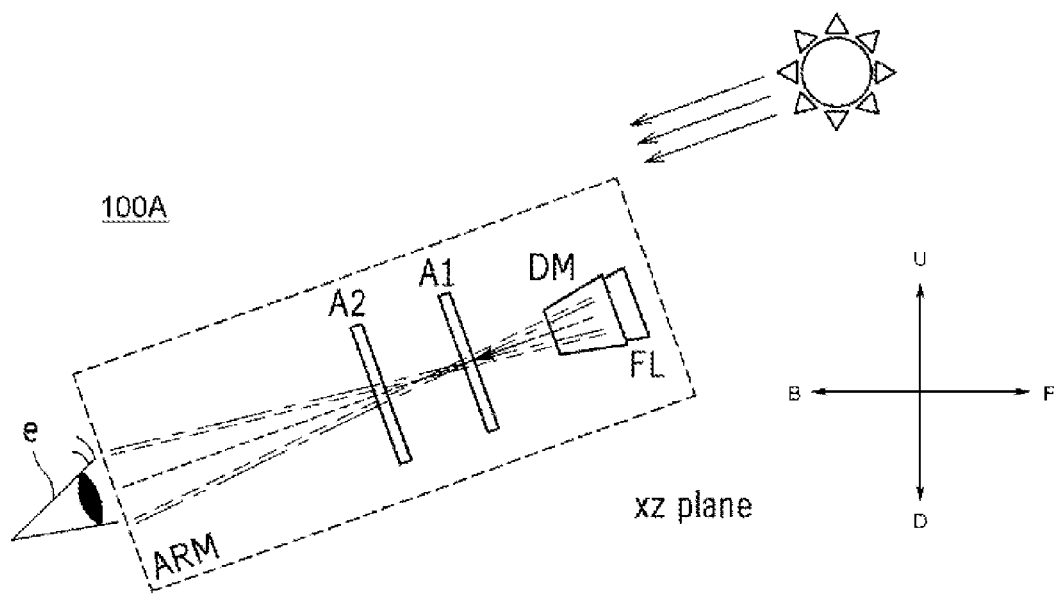
FIG. 4A is a side view showing an image display device according to a modification.
Figure 4B:
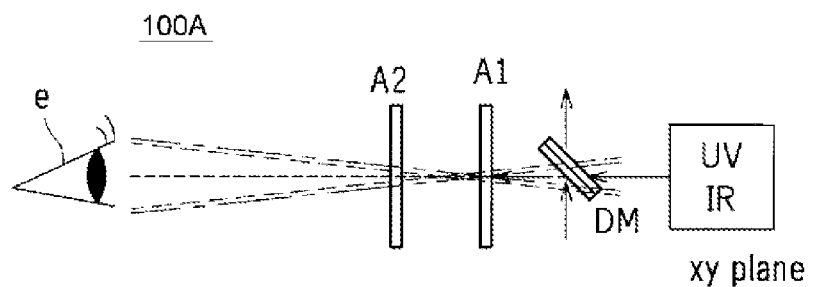
FIG. 4B is a diagram showing a state in which ultraviolet light and infrared light are cut in the image display device according to the modification.

FIGS. 4A and 4B are diagrams showing a modification of the image display device 100, in which FIG. 4A is a schematic side view, and FIG. 4B is a diagram schematically showing a state in which ultraviolet light and infrared light are cut. In the present modification, the image forming positions of the first image A1 and the second image A2 are moved upward from the front center direction by rotating the rotation support unit ARM of the image display device 100 shown in FIG. 1 in the up direction. In this case, in order for the viewer to visually recognize the aerial images of the first image A1 and the second image A2, the user needs to move his or her line of sight upward. Considering that the image display device 100 is used outdoors, sunlight or external light may travel to the viewpoint e from above the user. Therefore, an image display device 100A of the present modification combines a wavelength filter FL with the dichroic mirror DM forming the image forming optical unit to cut unnecessary external light.

The wavelength filter FL is an optical member that cuts ultraviolet light and/or infrared light. A known film structure may be used for the wavelength film FL. In FIGS. 4A and 4B, an example in which the dichroic mirror DM and the wavelength filter FL are formed separately is shown, but both may be combined and integrally formed. In addition, the dichroic mirror DM may be configured to reflect ultraviolet light and/or infrared light, and the dichroic mirror DM may also function as the wavelength filter FL.

As shown in FIG. 4B, even if ultraviolet light or infrared light travels from the outside in the direction of the viewpoint e, the ultraviolet light and the infrared light are cut or reflected by the wavelength filter FL, so that the ultraviolet light and the infrared light do not reach the viewpoint e. Accordingly, even when the rotation support unit ARM is rotated upward, it is possible to prevent ultraviolet light or infrared light from the outside from being directly incident on the viewpoint e of the viewer, and to protect the eyes of the viewer.

Second Embodiment

Figure 5:
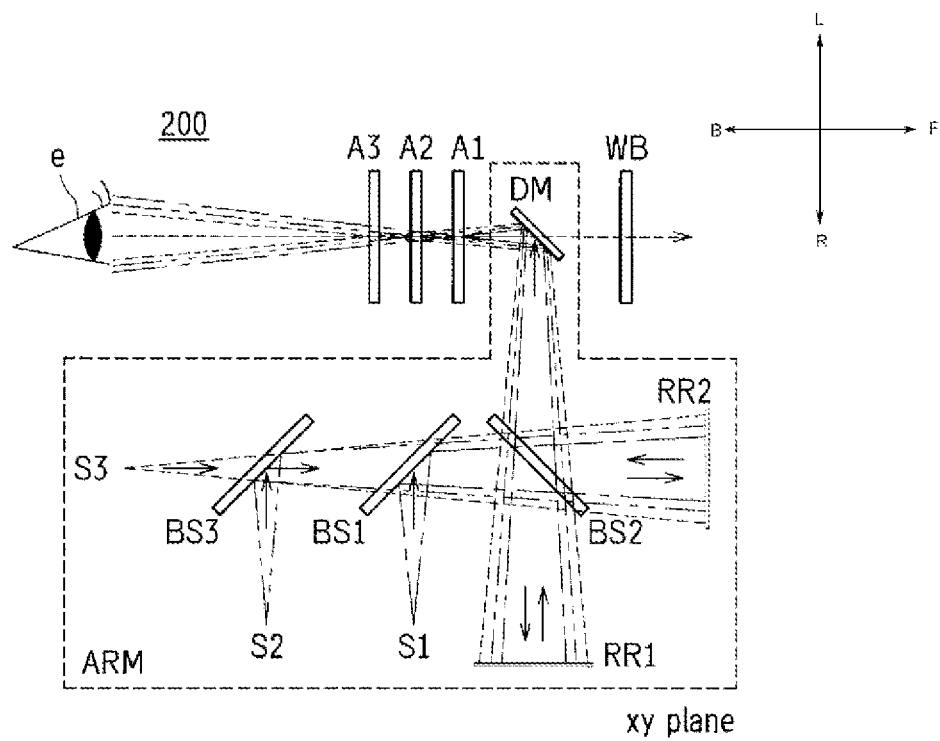
FIG. 5 is a plan view showing an image display device according to a second embodiment.
Figure 6:
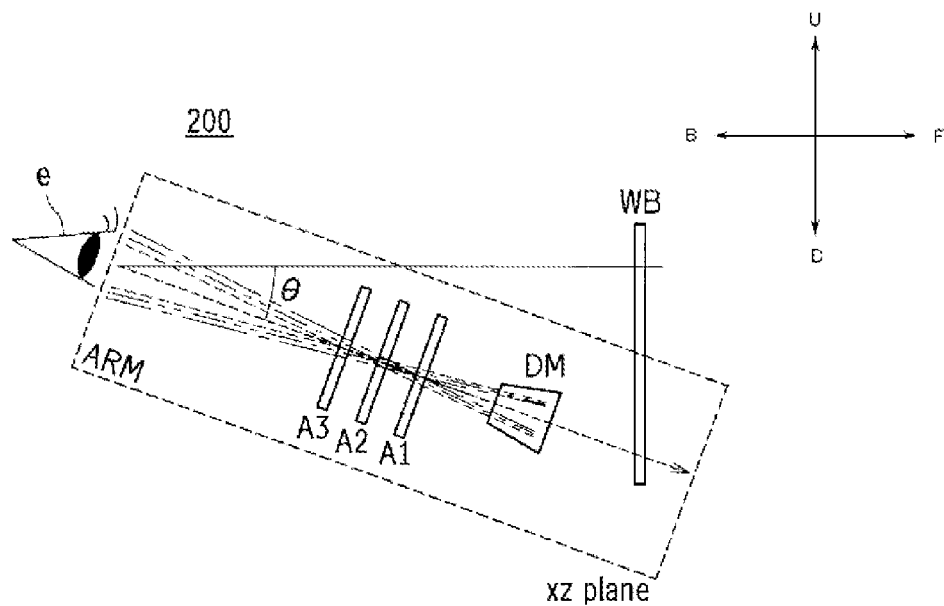
FIG. 6 is a side view showing the image display device according to the second embodiment.
Figure 7:
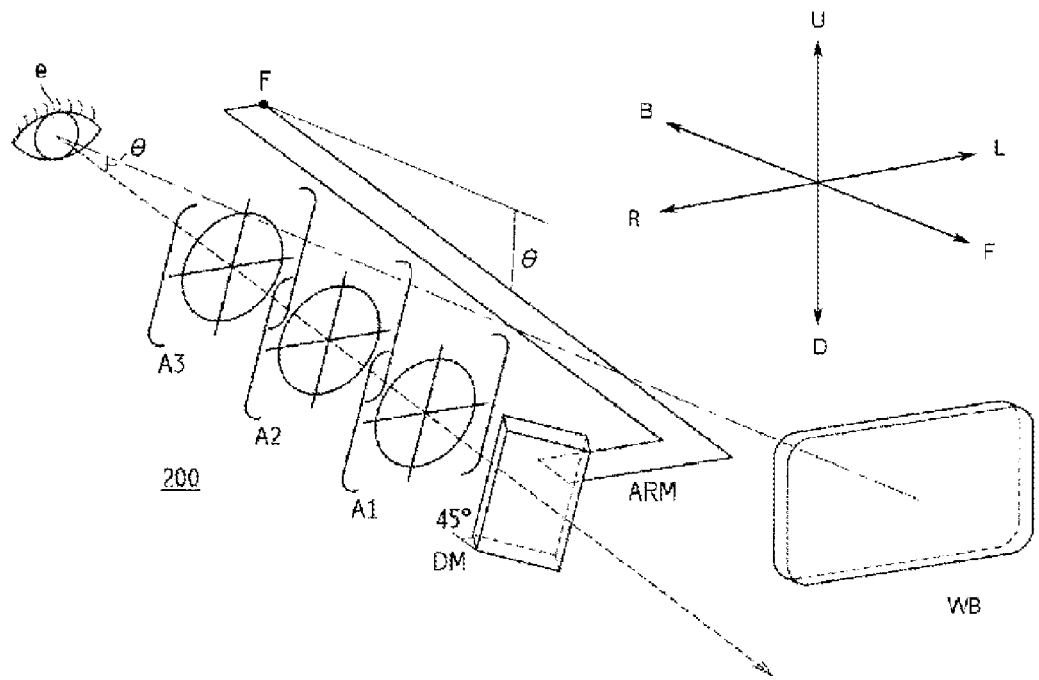
FIG. 7 is a perspective view showing the image display device according to the second embodiment.

Next, a second embodiment of the present disclosure will be described with reference to FIGS. 5 to 7. The description of the same contents as those of the first embodiment will be omitted. The present embodiment is different from the first embodiment in that the number of aerial images formed in the air is increased. FIG. 5 is a plan view showing a configuration of an image display device 200 according to the present embodiment. FIG. 6 is a side view showing the configuration of the image display device 200 according to the present embodiment. FIG. 7 is a perspective view showing the configuration of the image display device 200 according to the embodiment.

As shown in FIGS. 5 to 7, the image display device 200 includes beam splitters BS1, BS2, and BS3, the retroreflection units RR1, RR2, the dichroic mirror DM, the first image projection unit S1, the second image projection unit S2, a third image projection unit S3, and the rotation support unit ARM.

The beam splitter BS3 is a member that transmits a part of the incident light and reflects a part of the incident light. A partial reflection plate on which a film for adjusting the reflectance is formed may be used on a surface of the beam splitter BS3. The beam splitter BS3 is arranged so as to be inclined at an angle of 45 degrees with respect to the lateral direction and the depth direction. At this time, an inclination direction of the beam splitter BS3 and an inclination direction of the beam splitter BS1 are the same, that is, the beam splitter BS3 is arranged so as to face the beam splitter BS1 in parallel.

The third image projection unit S3 is a device that emits light for forming an image, and projects the image at a predetermined distance from the eyes (viewpoint e) of the viewer. The second image projection unit S2 is arranged on a right side of the beam splitter BS3, and irradiates one surface (a surface facing the beam splitter BS1) of the beam splitter BS3 with light in the lateral direction. The third image projection unit S3 is arranged in the rear direction with respect to the beam splitters BS1, BS2, and BS3 and the retroreflection unit RR2, and irradiates the other surface (the surface opposite to the beam splitter BS1) of the beam splitter BS3 with light in the depth direction.

The rotation support unit ARM is a member that supports the beam splitters BS1, BS2, and BS3, the retroreflection units RR1, RR2, and the dichroic mirror DM included in the image forming optical unit while maintaining a relative positional relationship therebetween, and is a member provided so as to be rotatable around the fulcrum point F as a rotation center. In the present embodiment, an example is shown in which the first image projection unit S1, the second image projection unit S2, and the third image projection unit S3 are also held by the rotation support unit ARM.

The light emitted from the second image projection unit S2 is reflected by the beam splitter BS3, passes through the beam splitter BS1, and reaches the beam splitter BS2. In addition, the light emitted from the third image projection unit S3 passes through the beam splitter BS3 and the beam splitter BS1, and then reaches the beam splitter BS2. By passing through the beam splitter BS3, the light emitted from the second image projection unit S2 and the light emitted from the third image projection unit S3 are incident on the beam splitter BS2 at the same incident angle. That is, after passing through the beam splitter BS3, an optical axis of the remaining light emitted from the second image projection unit S2 and an optical axis of the light emitted from the third image projection unit S3 are aligned in parallel. That is, the beam splitter BS3 functions as an optical axis aligning unit.

The light incident on the beam splitter BS1 is incident on the dichroic mirror DM along the same path as in the first embodiment, and forms aerial images as the first image A1, the second image A2, and a third image A3 in the air. In the image display device 200 of the present embodiment, the beam splitter BS3 and the third image projection unit S3 are added, so that the number of aerial images formed in the air can be added. Although FIGS. 5 to 7 show an example in which three aerial images are formed by using three image projection units, the number of images can be further increased by increasing the number of beam splitters and image projection units.

Also in the image display device 200 of the present embodiment, the dichroic mirror DM held by the rotation support unit ARM rotates around the fulcrum point F. Accordingly, the positions of the first image A1 to the third image A3 to be formed in the space can be changed, and the degree of freedom of the display position can be improved.

The present disclosure is not limited to the embodiments described above, various modifications can be made within the scope of the claims, and embodiments obtained by appropriately combining technical methods disclosed in different embodiments are also included in the technical scope of the present disclosure.

The present application appropriately incorporates the contents disclosed in Japanese Patent Application (Japanese Patent Application No. 2020-011275) filed on Jan. 27, 2020.

The invention claimed is:

1. An image display device comprising:
a first display configured to emit light for forming a first image;
an image forming optical unit configured to form the first image at a first distance and cause the first image to be incident on a viewpoint of a user; and
a support configured to rotatably hold the image forming optical unit with a fulcrum point as a rotation center;
wherein the image forming optical unit includes
a first beam splitter that reflects a part of the light emitted from the first display in a first direction and transmits remaining light in a second direction,
a first retroreflector that retroreflects the light traveling in the first direction to the first beam splitter, and
a second retroreflector that retroreflects the light traveling in the second direction to the first beam splitter,
wherein the first beam splitter transmits the light reflected by the first retroreflector in a third direction and reflects the light reflected by the second retroreflector in the third direction, and
wherein the image display device further comprises a dichroic mirror that forms an image of the light traveling in the third direction in a space.

2. The image display device according to claim 1, wherein the first display is held by the support.

3. The image display device according to claim 1, wherein a distance from the fulcrum point to the image forming optical unit is equal to a distance from the viewpoint to the image forming optical unit.

4. The image display device according to claim 1, wherein the image forming optical unit includes a wavelength filter that cuts ultraviolet light and/or infrared light.

5. The image display device according to claim 1, wherein the support is rotatable within a range of 25 degrees in an up-down direction from a front center direction of the viewer.

6. The image display device according to claim 1, further comprising:
a second display configured to emit light for forming a second image; and
a second beam splitter configured to cause the light emitted from the second display to be incident on the first beam splitter at the same incident angle as that of the light emitted from the first display.

* * * * *